US012737076B2

(12) United States Patent
Kadowaki

(10) Patent No.: US 12,737,076 B2
(45) **Date of Patent: *Sep. 15, 2026**

(54) SYSTEM FOR TOUCH PAD

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,070

(22) Filed: Apr. 24, 2025

(65) Prior Publication Data

US 2025/0251830 A1 Aug. 7, 2025

Related U.S. Application Data

(63) Continuation of application No. 18/676,230, filed on May 28, 2024, now Pat. No. 12,314,512, which is a (Continued)

(51) Int. Cl.
*G06F 3/041* (2006.01)
*G06F 3/0354* (2013.01)
*G06F 3/04883* (2022.01)

(52) U.S. Cl.
CPC ...... *G06F 3/04166* (2019.05); *G06F 3/03547* (2013.01); *G06F 3/04883* (2013.01)

(58) Field of Classification Search
CPC ............ G06F 3/03547; G06F 3/04166; G06F 3/04883; G06F 3/03545
See application file for complete search history.

(56) References Cited

U.S. PATENT DOCUMENTS 5,777,605 A 7/1998 Yoshinobu et al.
9,207,801 B2 12/2015 Schediwy et al.
(Continued)

FOREIGN PATENT DOCUMENTS

JP H04149624 A 5/1992
JP H05324178 A 12/1993
(Continued)

OTHER PUBLICATIONS

International Search Report, dated Jul. 23, 2019, for International Patent Application No. PCT/JP2019/017383. (4 pages) (with English translation).

(Continued)

*Primary Examiner* — Michael Pervan
(74) *Attorney, Agent, or Firm* — Seed Intellectual Property Law Group LLP

(57) ABSTRACT

Provided is a system for a touch pad used by both a finger and a pen to input operations to a computer. The system includes a sensor electrode group, an integrated circuit, and a memory storing a device driver. The sensor electrode group is configured to be placed over a touch surface that is different from a display surface of the computer. The integrated circuit uses the sensor electrode group to detect a touch position on the touch surface where the finger is in contact and a pen position on the touch surface where the pen is in contact and supplies the detected touch position and pen position to the device driver. The device driver is configured to convert the touch position into relative coordinates when the device driver receives the touch position, and convert the pen position into absolute coordinates when the device driver receives the pen position.

14 Claims, 8 Drawing Sheets

Related U.S. Application Data continuation of application No. 18/309,477, filed on Apr. 28, 2023, now Pat. No. 12,019,825, which is a continuation of application No. 17/501,930, filed on Oct. 14, 2021, now Pat. No. 11,669,200, which is a continuation of application No. PCT/JP2019/017383, filed on Apr. 24, 2019.

(56) References Cited

U.S. PATENT DOCUMENTS

| | | | | |
|---|---|---|---|---|
| 11,762,495 | B2 * | 9/2023 | Chen | G06F 3/03547 345/173 |
| 2001/0017617 | A1 | 8/2001 | Uchiyama | |
| 2008/0042985 | A1 | 2/2008 | Katsuhito et al. | |
| 2012/0113001 | A1 | 5/2012 | Yamauchi et al. | |
| 2020/0081577 | A1 | 3/2020 | Nomura et al. | |
| 2022/0317800 | A1 * | 10/2022 | Chen | G06F 3/0416 |

FOREIGN PATENT DOCUMENTS

| | | | |
|---|---|---|---|
| JP | H08307954 | A | 11/1996 |
| JP | 2000066830 | A | 3/2000 |
| JP | 2001228964 | A | 8/2001 |
| JP | 2007287118 | A | 11/2007 |
| JP | 6473554 | B1 | 2/2019 |
| WO | 2011145330 | A1 | 11/2011 |

OTHER PUBLICATIONS

Japanese Office Action, dated Apr. 2, 2024, for Japanese Patent Application No. 2023-139758. (6 pages) (with English translation).

* cited by examiner

12
DEVICE DRIVER
20
21
TOUCH POSITION CONVERSION PROCESSING
RELATIVE COORDINATES
22
PEN POSITION CONVERSION PROCESSING
ABSOLUTE COORDINATES
13
MEMORY
14
3
TOUCH PANEL (SENSOR ELECTRODE GROUP)
INTEGRATED CIRCUIT
TOUCH POSITION
PEN POSITION
30
31
RIGHT CLICK BUTTON
4
LEFT CLICK BUTTON
5
KEYBOARD
6
DISPLAY
7
INPUT-OUTPUT CIRCUIT
11

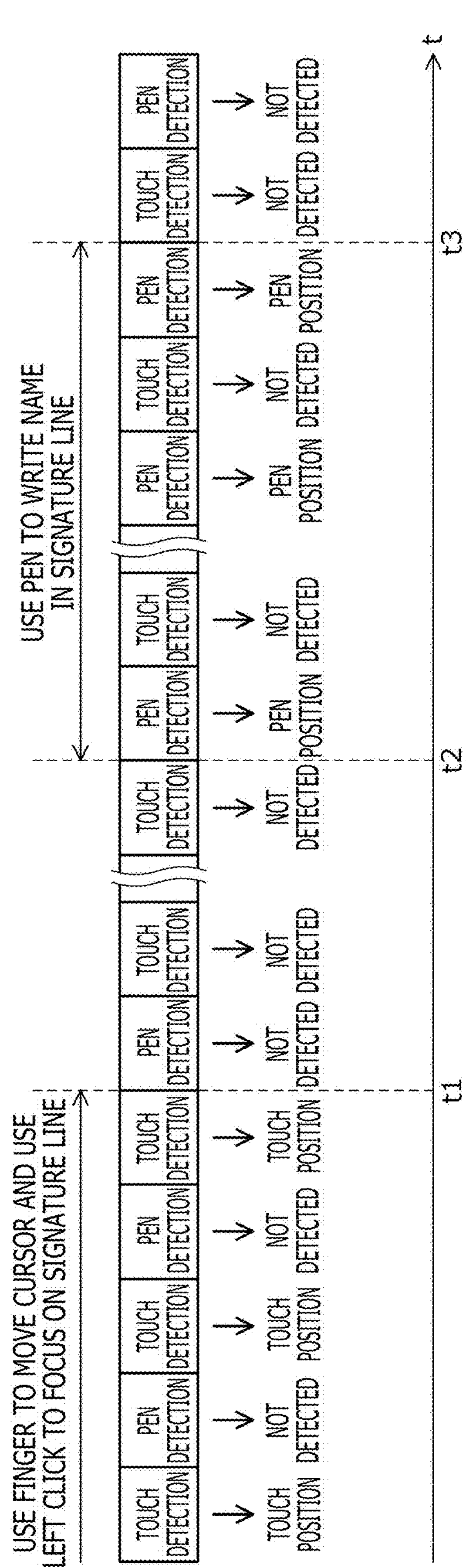
F I G . 3

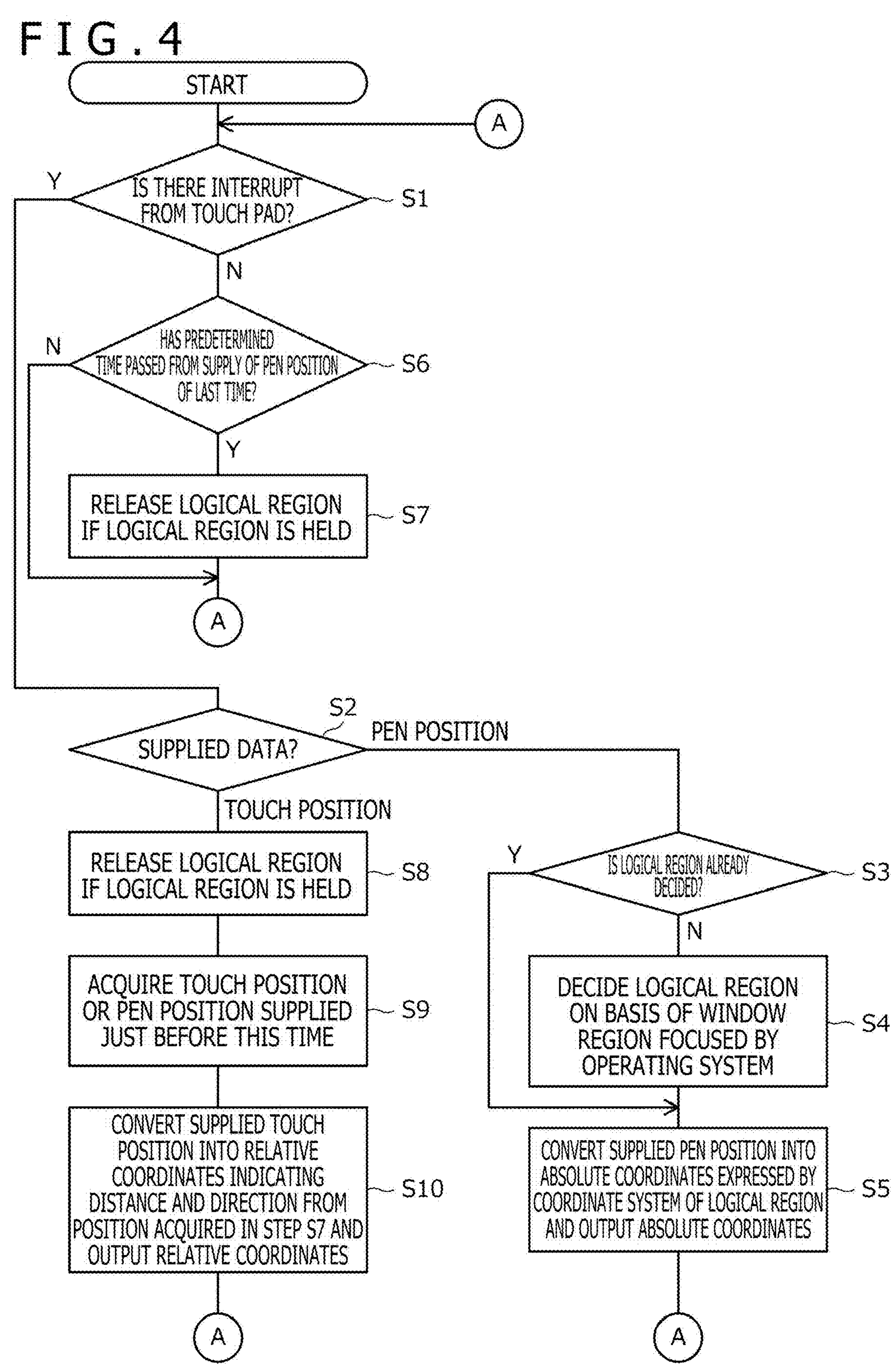
FIG. 4
START
A
IS THERE INTERRUPT FROM TOUCH PAD?
S1
Y
N
HAS PREDETERMINED TIME PASSED FROM SUPPLY OF PEN POSITION OF LAST TIME?
S6
N
Y
RELEASE LOGICAL REGION IF LOGICAL REGION IS HELD
S7
A
S2
SUPPLIED DATA?
PEN POSITION
TOUCH POSITION
RELEASE LOGICAL REGION IF LOGICAL REGION IS HELD
S8
ACQUIRE TOUCH POSITION OR PEN POSITION SUPPLIED JUST BEFORE THIS TIME
S9
CONVERT SUPPLIED TOUCH POSITION INTO RELATIVE COORDINATES INDICATING DISTANCE AND DIRECTION FROM POSITION ACQUIRED IN STEP S7 AND OUTPUT RELATIVE COORDINATES
S10
A
Y
IS LOGICAL REGION ALREADY DECIDED?
S3
N
DECIDE LOGICAL REGION ON BASIS OF WINDOW REGION FOCUSED BY OPERATING SYSTEM
S4
CONVERT SUPPLIED PEN POSITION INTO ABSOLUTE COORDINATES EXPRESSED BY COORDINATE SYSTEM OF LOGICAL REGION AND OUTPUT ABSOLUTE COORDINATES
S5
A

T
30A
30
5
4
30B
INTEGRATED CIRCUIT
31
11

SYSTEM FOR TOUCH PAD

BACKGROUND

Technical Field

The present disclosure relates to a system for touch pad, and particularly, to a system for touch pad used by both a finger and a pen to input operations to a computer.

Background Art

There is a known input system that uses a sensor electrode group placed over a display apparatus to detect contact positions of a pen and a finger on a display surface in time division and that supplies the contact positions to an operating system. An example of the above-described input system is disclosed in Japanese Patent No. 6473554. The positions supplied to the operating system are used to control movement of a cursor or to input a line drawing to a drawing application.

The data actually supplied from this type of input system to the operating system usually includes coordinates in a coordinate system of the display surface. For example, two-dimensional coordinates (x, y) of the rectangular display surface decided with the long side as the x-axis and the short side as the y-axis are supplied as a contact position of the pen or the finger to the operating system. Hereinafter, the coordinates in the coordinate system of a surface in this way will be referred to as "absolute coordinates."

Some notebook personal computers and the like include input systems called touch pads. The touch pad is an apparatus including a plane (hereinafter, referred to as a "touch surface") on which a user can slide a finger. The touch pad is configured to detect a contact position of the finger (hereinafter, referred to as a "touch position") on the touch surface and supply the touch position to the operating system. An example of the touch pad is disclosed in U.S. Pat. No. 9,207,801.

The data actually supplied from the touch pad to the operating system is usually data indicating the distance and the direction of movement of the touch position. For example, coordinates ($x_N$-$x_O$, $y_N$-$y_O$) indicating a vector ending at a touch position ($x_N$, $y_N$) detected at certain time and starting at a touch position ($x_O$, $y_O$) detected just before the touch position ($x_N$, $y_N$) are supplied as data indicating the touch position of the finger to the operating system. Hereinafter, the data indicating the distance and the direction of movement of the touch position will be referred to as "relative coordinates." Note that when there is no coordinate as a start point (that is, just after the finger has touched the touch surface), the data is not supplied to the operating system. By using the relative coordinates, the user can use a finger to repeatedly trace the same region on the relatively narrow touch surface to move the cursor in the entire area of the relatively wide display surface.

The inventor of the present specification is examining to configure the touch pad to allow detecting not only the touch position, but also a contact position of the pen (hereinafter, referred to as a "pen position") on the touch surface.

However, after detailed examination for the realization of such a touch pad, the inventor of the present specification has found out that it is difficult to normally input a line drawing even if the pen input can be performed on the touch pad. More specifically, the position on the touch surface and the position on the display surface need to correspond one-to-one in inputting the line drawing. However, such a relation is not established in the relative coordinates used for the output of the touch pad, and the line drawing cannot be normally input.

If the data supplied from the touch pad to the operating system is changed from the relative coordinates to the above-described absolute coordinates (in this case, coordinates in the coordinate system of the touch surface), the pen can be used to input the line drawing for the time being. However, the touch surface is generally much smaller than the display surface, and it is difficult to input a detailed line drawing even in this configuration. Further, if the data supplied from the touch pad to the operating system is changed to the absolute coordinates, the advantage of the relative coordinates as described above cannot be obtained, and this obstructs the control of the movement of the cursor with use of the finger.

BRIEF SUMMARY

Therefore, an object of the present disclosure is to provide a system for touch pad that can favorably realize both control of a cursor with use of a finger and input of a line drawing with use of a pen.

The present disclosure provides a system for a touch pad used by both a finger and a pen to input operations to a computer. The system includes a sensor electrode group, an integrated circuit, and a memory storing a device driver configured to be executed by the computer. The sensor electrode group is configured to be placed over a touch surface that is different from a display surface of the computer. The integrated circuit, in operation, uses the sensor electrode group to detect a touch position on the touch surface where the finger is in contact with the touch surface and a pen position on the touch surface where the pen is in contact with the touch surface and supplies the detected touch position and pen position to the device driver based on absolute coordinates in a coordinate system of the touch surface. The device driver is configured to convert the touch position into relative coordinates indicating a distance and a direction of movement of the touch position and output the relative coordinates when the device driver receives the touch position from the integrated circuit. The device driver is configured to convert the pen position into absolute coordinates in a coordinate system of a logical region held by the computer at a time of reception of the pen position and output the absolute coordinates when the device driver receives the pen position from the integrated circuit.

According to the present disclosure, the device driver uses different methods according to the type of contact position (touch position or pen position) supplied from the integrated circuit to convert the coordinates. This can favorably realize both control of a cursor with use of a finger and input of a line drawing with use of a pen.

BRIEF DESCRIPTION OF THE DRAWINGS

FIG. 3 is a diagram illustrating, in chronological order, position detection performed by an integrated circuit illustrated in FIG. 2;

FIG. 4 is a flow chart illustrating details of a process performed by a device driver illustrated in FIG. 2;

FIG. 6A is an explanatory diagram of conversion performed at S5 of FIG. 4, and FIG. 6B is an explanatory diagram of conversion performed at S10 of FIG. 4;

FIG. 8 depicts a touch pad according to a second embodiment of the present disclosure.

DETAILED DESCRIPTION

Embodiments of the present disclosure will now be described in detail with reference to the attached drawings.

Figure 1:
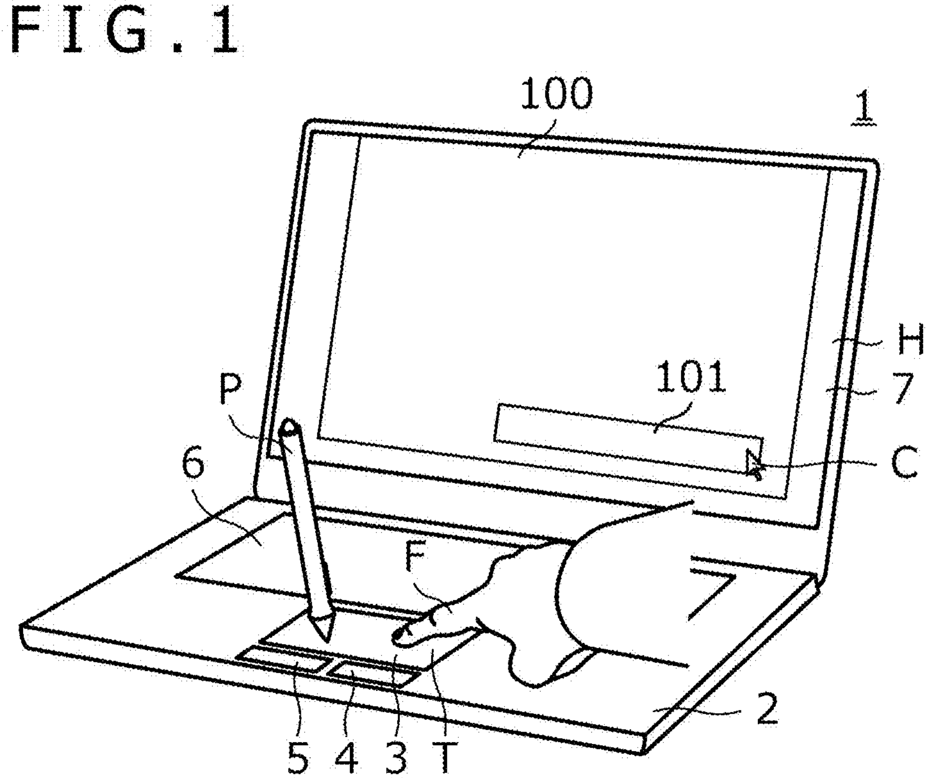
FIG. 1 depicts a notebook computer according to a first embodiment of the present disclosure.
Figure 2:
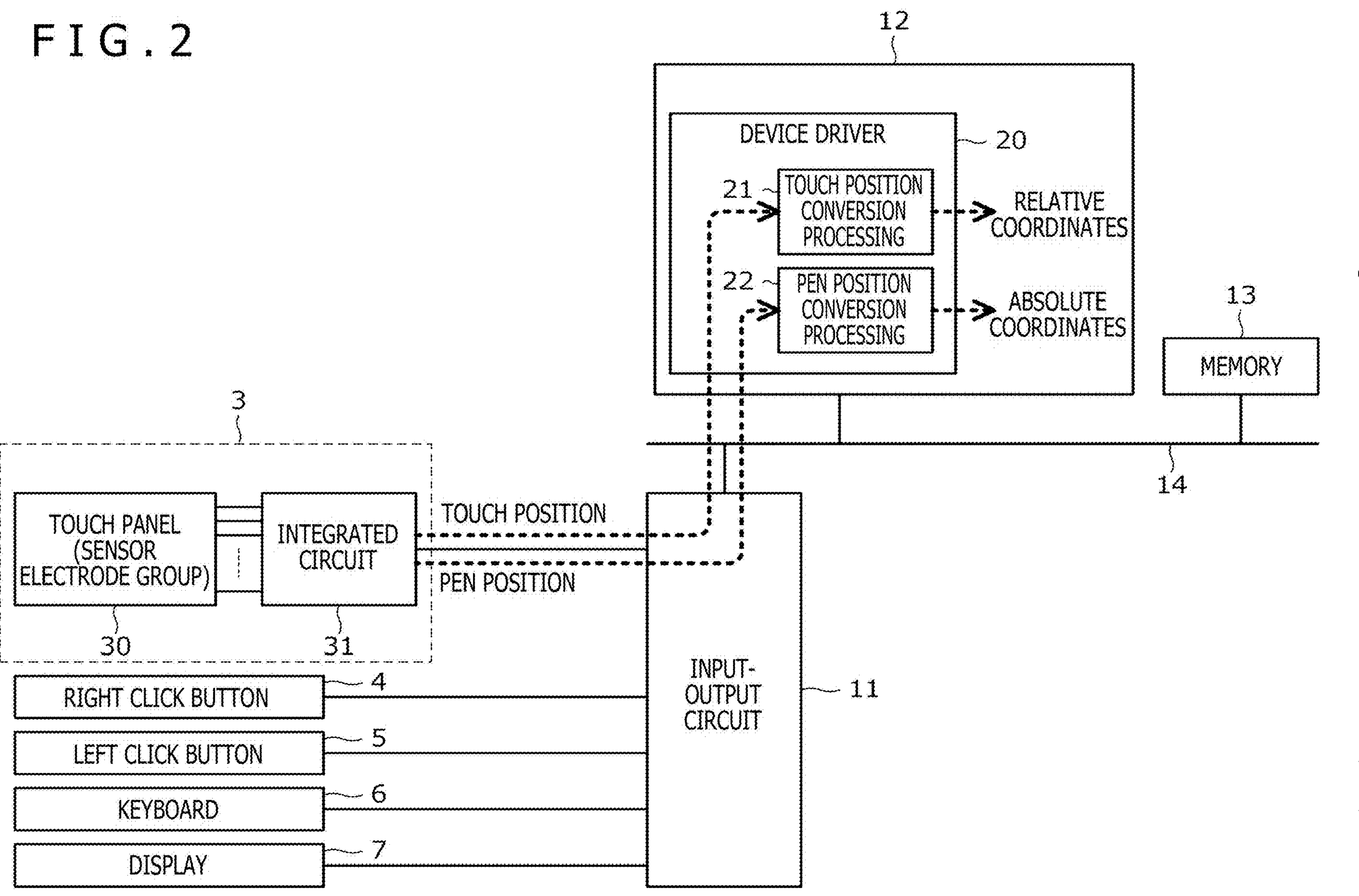
FIG. 2 depicts an internal configuration and functional blocks of the notebook computer illustrated in FIG. 1.

FIG. 1 depicts a notebook computer 1 according to a first embodiment of the present disclosure. As illustrated in FIG. 1, the notebook computer 1 is a portable computer and includes a housing 2, a touch pad 3 including a touch surface T, a right click button 4, a left click button 5, a keyboard 6, and a display 7 including a display surface H. Although the right click button 4 and the left click button 5 are provided separately from the touch surface T in the example of FIG. 1, the touch surface T may be configured as click buttons. FIG. 2 depicts an internal configuration and functional blocks of the notebook computer 1. As illustrated in FIG. 2, the notebook computer 1 includes an input-output circuit 11, a central processing unit (CPU) 12, and a memory 13 that are connected to one another through a bus 14.

The CPU 12 is a central processing unit of the notebook computer 1. In one or more implementations, the CPU 12 includes a processor and a working memory storing instructions that, when executed by the processor, cause the CPU 12 perform the functions described herein. The CPU 12 plays a role of reading and executing programs stored in the memory 13. Examples of the programs executed in this way include various applications, such as an operating system of the notebook computer 1 and a drawing application, and device drivers of various types of hardware. FIG. 2 illustrates only a device driver 20 of the touch pad 3 among them.

FIG. 1 illustrates a state in which a cursor C and a document 100 including a signature line 101 are displayed on the display surface H of the display 7. The CPU 12 executes the operating system to display the cursor C and executes a word processing application to display the document 100.

FIG. 2 will be further described, the memory 13 includes a storage apparatus including a main storage device, such as a dynamic random access memory (DRAM), and an auxiliary storage device, such as a hard disk. Various programs executed by the CPU 12 and various types of data referenced, generated, and updated by the various programs are stored in the memory 13.

The input-output circuit 11 is a circuit that functions as an interface for connecting various types of hardware installed inside and outside of the notebook computer 1 to the CPU 12. Specifically, the input-output circuit 11 may include a circuit corresponding to a universal serial bus (USB) standard. Examples of the hardware connected to the CPU 12 through the input-output circuit 11 include the touch pad 3, the right click button 4, the left click button 5, the keyboard 6, and the display 7 as illustrated in FIG. 2.

The right click button 4 and the left click button 5 are each a press button switch that provides a click feeling to a user pressing the button and is used for inputting a click operation. The keyboard 6 includes various keys including a plurality of letter keys, a plurality of symbol keys, and a plurality of function keys. Information indicating the press of the right click button 4, the left click button 5, and various keys in the keyboard 6 is transmitted to the CPU 12 through the input-output circuit 11.

The display 7 is a display apparatus including, for example, a liquid crystal display or an organic electroluminescent (EL) display. The display 7 plays a role of displaying letters and images on the display surface H illustrated in FIG. 1 according to drawing data supplied from the CPU 12 through the input-output circuit 11.

The touch pad 3 includes a touch panel 30 and an integrated circuit 31. Of these, the touch panel 30 is a touch panel corresponding to a capacitance system. The touch panel 30 includes the touch surface T (see FIG. 1) that is different from the display surface H of the notebook computer 1; and a sensor electrode group arranged just below the touch surface T.

The touch surface T includes a plane suitable for the user to slide a finger F and a pen P illustrated in FIG. 1. Examples of specific structure of the touch surface T include a simple flat plate that does not particularly have an electrical function and a structure, such as what is called Boogie Board (registered trademark), in which the trajectory of the pen P is visualized on the touch surface T. The latter structure will be described in detail in a second embodiment.

The sensor electrode group includes, for example, a plurality of rectangular linear electrodes (hereinafter, referred to as "X-electrodes") extending in a short-side direction of the touch surface T and a plurality of rectangular linear electrodes (hereinafter, referred to as "Y-electrodes") extending in a long-side direction of the touch surface T. The X-electrodes are arranged at equal intervals in the long-side direction of the touch surface T, and the Y-electrodes are arranged at equal intervals in the short-side direction of the touch surface T. However, the configuration of the sensor electrode group is not limited to this, and the sensor electrode group can include, for example, a plurality of island-like electrodes arranged in a matrix.

The integrated circuit 31 uses the above-described sensor electrode group to execute a process of detecting a touch position on the touch surface T where the finger F is in contact with the touch surface T and detecting a pen position on the touch surface T where the pen P is in contact with the touch surface T. Although the specific method of detecting the position is not particularly limited, it is preferable to adopt a detection method in which, for example, the detection of the touch position based on the capacitance system and the detection of the pen position based on the active capacitive system are performed in time division. The touch position and the pen position detected by the integrated circuit 31 are supplied to the device driver 20 through the input-output circuit 11. In this case, the data actually supplied from the integrated circuit 31 to the device driver 20 includes absolute coordinates in the coordinate system of the touch surface T.

FIG. 3 is a diagram illustrating, in chronological order, the position detection performed by the integrated circuit 31. As illustrated in FIG. 3, the integrated circuit 31 is configured to detect the touch position and the pen position in time division.

FIG. 3 illustrates an example of a case in which the user moves the cursor C to the signature line 101 illustrated in FIG. 1 and causes the operating system to provide input focus to the signature line 101 before time t1, and the user then writes the name of the user in the signature line 101 from time t2 to time t3.

In the example, the user first slides the finger F on the touch surface T to move the cursor C to the signature line 101. The user presses the left click button 5 illustrated in FIG. 1 to causes the operating system to provide input focus to the signature line 101 (before time t1). Meanwhile, only the touch position is continuously output from the integrated circuit 31, and the pen position is not output.

Subsequently, the user holds the pen P in hand and inputs the name of the user on the touch surface T (time t2 to time t3). Meanwhile, only the pen position is continuously output from the integrated circuit 31, and the touch position is not output.

FIG. 2 will be further described. The device driver 20 is a program included in a system for touch pad along with the sensor electrode group in the touch panel 30, the integrated circuit 31, and the like. The device driver 20 causes the CPU 12 to perform various types of processing including touch position conversion processing 21 and pen position conversion processing 22. The touch position conversion processing 21 converts the coordinates indicating the touch position supplied from the integrated circuit 31 (absolute coordinates in the coordinate system of the touch surface T) into relative coordinates indicating the distance and the direction of movement of the touch position and outputting the relative coordinates. On the other hand, the pen position conversion processing unit 22 converts the coordinates indicating the pen position supplied from the integrated circuit 31 (absolute coordinates in the coordinate system of the touch surface T) into absolute coordinates in the coordinate system of a logical region held at the time of the supply of the pen position (any region in the display surface H set by a user operation, which will be described in detail later) and outputting the absolute coordinates.

FIG. 4 is a flow chart illustrating details of a process performed by the device driver 20 while the CPU 12 executes the device driver 20. The process performed by the device driver 20 will be described in detail with reference to FIG. 4.

As illustrated in FIG. 4, the device driver 20 first monitors generation of an interrupt from the touch pad 3 (S1). If there is an interrupt from the touch pad 3, the device driver 20 determines which one of the pen position and the touch position is included in the data supplied from the touch pad 3 (S2).

If the device driver 20 determines that the pen position is included in the data at S2, the device driver 20 determines whether or not the logical region is already decided (S3). If the device driver 20 determines that the logical region is not decided yet, the device driver 20 decides the logical region based on a window region having input focus by the operating system (S4). The device driver 20 stores the logical region decided at S4 in the memory 13 illustrated in FIG. 2.

Figure 5:
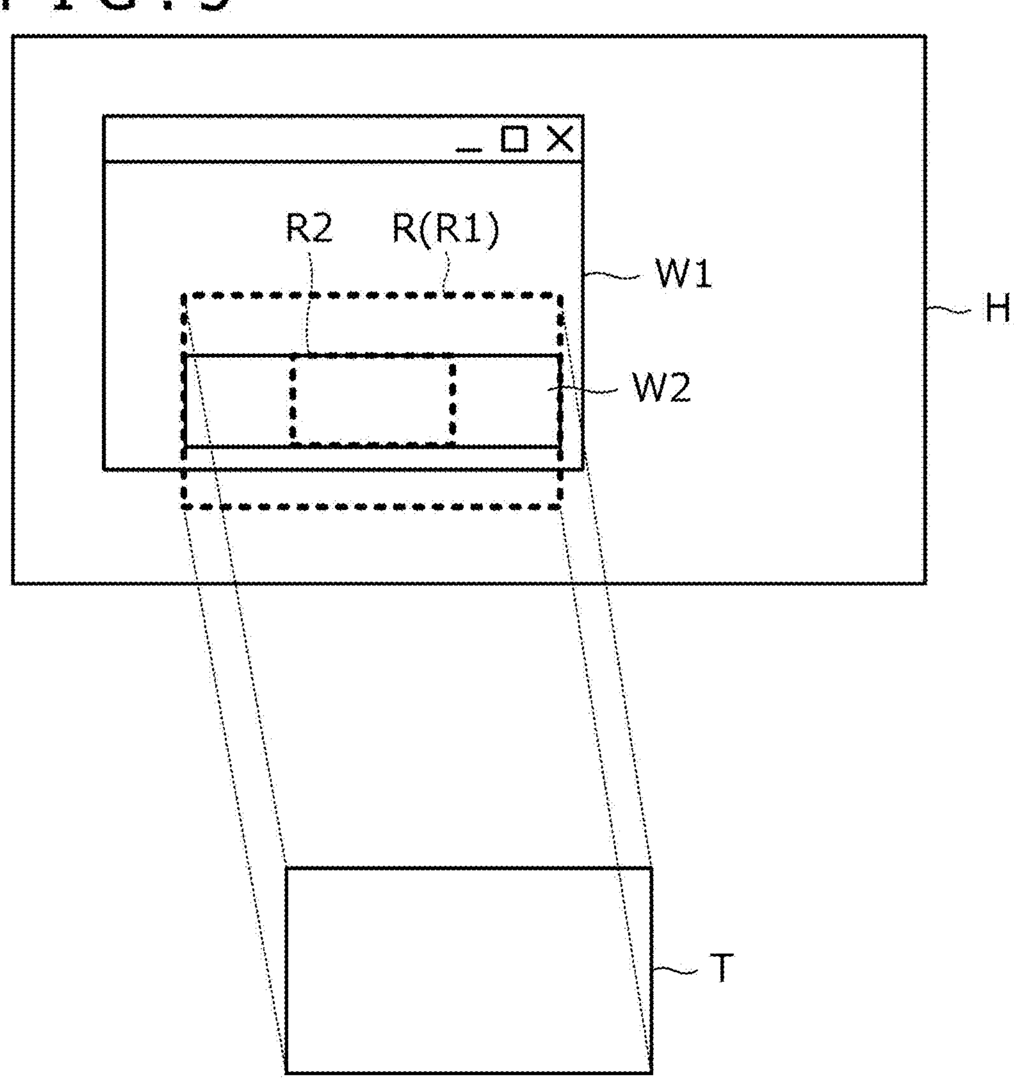
FIG. 5 is an explanatory diagram of decision of a logical region performed at S4 of FIG. 4.

FIG. 5 is an explanatory diagram of the decision of the logical region performed at S4. FIG. 5 illustrates an example in which the operating system displays a window region W1 including a sub-window region W2 on the display 7. The sub-window region W2 is, for example, the signature line 101 illustrated in FIG. 1.

It is assumed that the sub-window region W2 has input focus based on a user operation. The device driver 20 decides a logical region R so as to include the entire sub-window region W2. More specifically, the device driver 20 sets a logical region R1 including the long side in the same length as the length of the long side of the rectangular sub-window region W2 and having the same orientation and aspect ratio as those of the touch surface T. The device driver 20 sets a logical region R2 including the short side in the same length as the length of the short side of the rectangular sub-window region W2 and having the same orientation and aspect ratio as those of the touch surface T. The device driver 20 sets, as the logical region R, one of the two logical regions R1 and R2 (logical region R1 in FIG. 5) including the entire sub-window region W2 when the logical regions R1 and R2 are aligned at the center of the sub-window region W2. However, when the aspect ratios do not have to be equal (that is, when the line drawing depicted on the touch surface T may be vertically or horizontally extended on the display surface H), the device driver 20 may set the sub-window region W2 as the logical region.

FIG. 4 will be further described. If the device driver 20 decides the logical region at S4 or determines that the logical region is already decided at S3, the device driver 20 converts the pen position supplied from the integrated circuit 31 into absolute coordinates in the coordinate system of the decided logical region and outputs the absolute coordinates (S5).

Figures 6A, 6B:
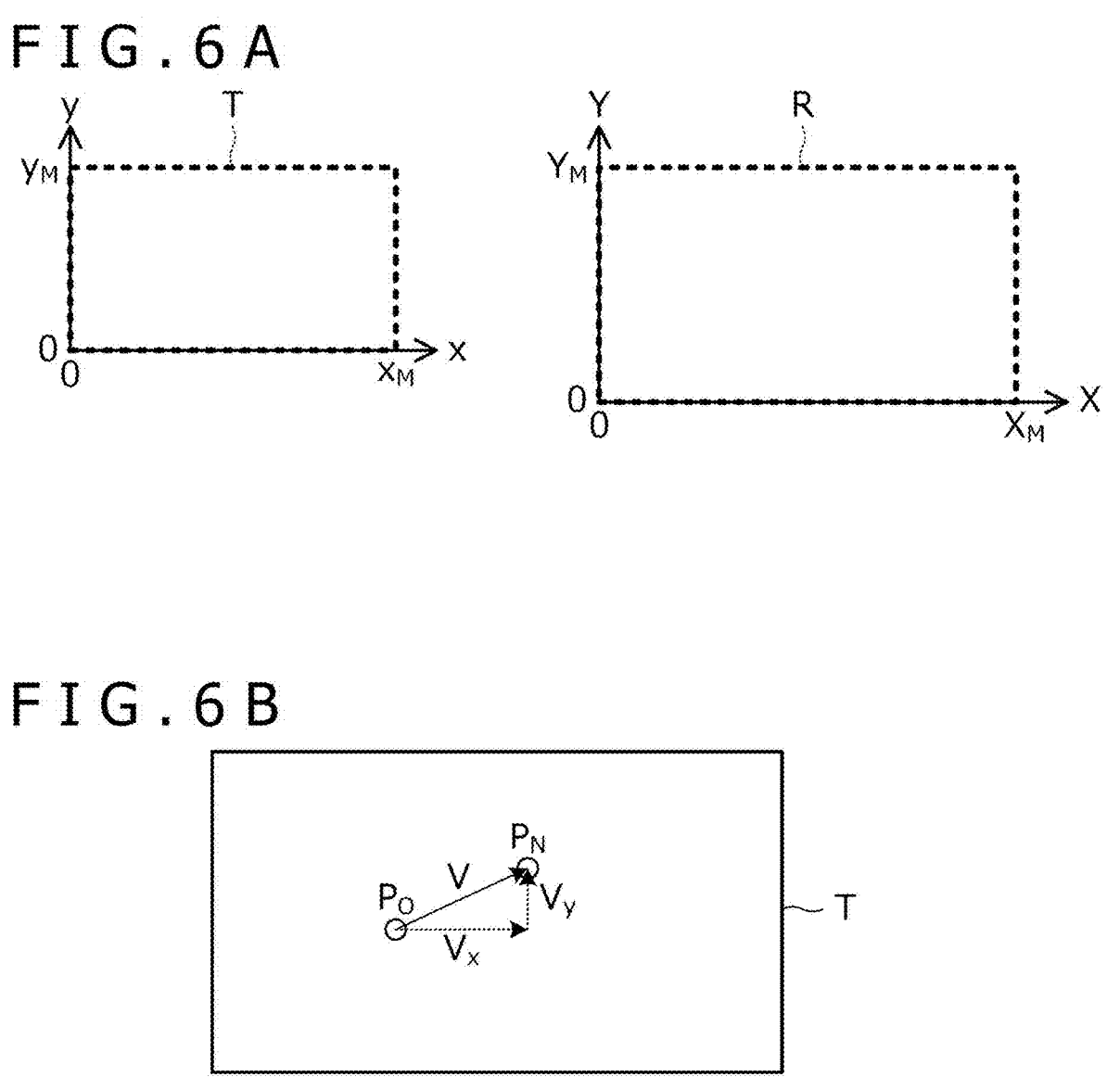

FIG. 6A is an explanatory diagram of the conversion performed at S5. Absolute coordinates (X, Y) output at S5 are expressed by Equation (1) below, where the touch surface T is a region of x=0 to $x_M$, y=0 to $y_M$, and the logical region R is a region of X=0 to $x_M$, Y=0 to $y_M$ as illustrated in FIG. 6A.

$$(X, Y) = (x \times X_M / x_M,\ y \times Y_M / y_M) \tag{1}$$

FIG. 4 will be further described. The device driver 20 that has output the absolute coordinates at S5 returns to S1 and monitors the generation of an interrupt from the touch pad 3. While monitoring, the device driver 20 measures the passage of time from the supply of the pen position of the last time. If the logical region decided at S4 is still held in the memory 13 when a predetermined time has passed, the device driver 20 releases the logical region (S6 and S7). That is, the device driver 20 deletes the logical region from the memory 13. After this, the determination result of S3 returns to "not decided yet."

When the device driver 20 determines that the touch position is included in the data at S2, the device driver 20 releases the logical region as at S7 if the logical region is held in the memory 13 at that point (S8) and then acquires the touch position or the pen position supplied just before the touch position of this time (S9). The device driver 20 converts the touch position supplied this time into relative coordinates indicating the distance and the direction from the position acquired at S9 and outputs the relative coordinates (S10).

FIG. 6B is an explanatory diagram of the conversion performed at S10. A point $P_O$ illustrated in FIG. 6B is a position acquired at S9, and a point $P_N$ is a position supplied at S1. A vector V illustrated in FIG. 6B is a vector starting at the point $P_O$ and ending at the point $P_N$. The relative coordinates obtained as a result of the conversion at S10 are expressed as ($V_x$, $V_y$), where $V_x$ is an x-direction component of the vector V, and $V_y$ is a y-direction component of the vector V.

FIG. 4 will be further described. The device driver 20 that has output the relative coordinates at S10 returns to S1 and monitors the generation of an interrupt from the touch pad 3. The device driver 20 then repeats the process described above.

As described above, according to the system for touch pad of the present embodiment, the device driver 20 uses different methods according to the type of contact position (touch position or pen position) supplied from the integrated circuit 31 to convert the coordinates. Therefore, the system for touch pad can favorably realize both the control of the cursor with use of the finger F and the input of a line drawing with use of the pen P.

In addition, according to the system for touch pad of the present embodiment, the touch position is output based on the relative coordinates indicating the distance and the direction of movement of the touch position. Therefore, the control of cursor similar to the conventional touch pad can be realized by the finger F.

Further, according to the system for touch pad of the present embodiment, the pen position is output based on the absolute coordinates in the coordinate system of the logical region held by the device driver 20 at the time of the supply of the pen position. Therefore, the pen P can be used to favorably input a line drawing in any region of the display surface.

In addition, according to the system for touch pad of the present embodiment, the pen position is regarded as a start point in detecting the relative coordinates when the touch position is detected following the pen position. Therefore, the cursor can be moved from the position on the display surface H designated lastly by the pen P.

Although the logical region is decided based on the window region having input focus by the operating system in the example described in the embodiment, the device driver 20 can use other methods to decide the logical region. Two examples of the methods will be described.

Figure 7A:
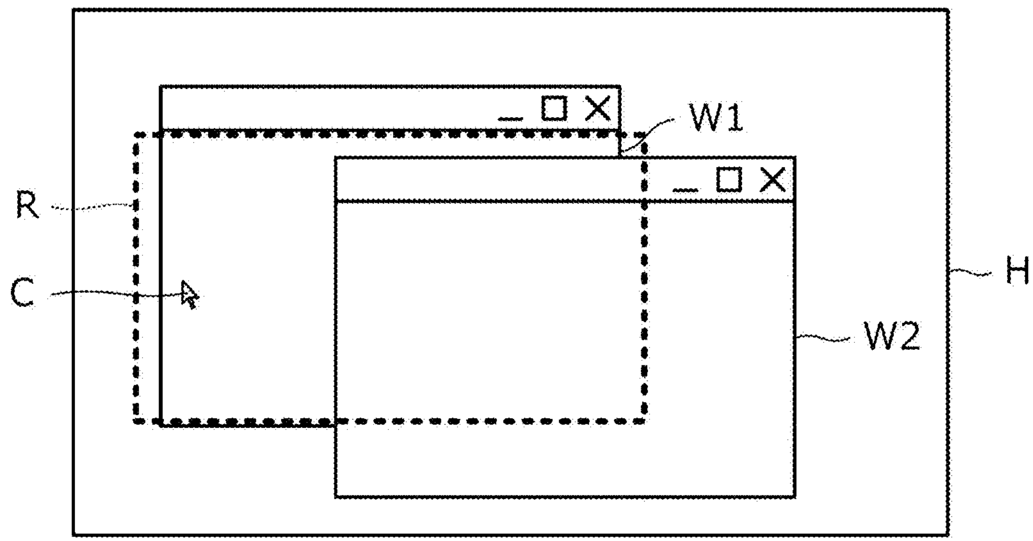
FIG. 7A depicts a decision method of the logical region according to a first modification of the first embodiment of the present disclosure.

FIG. 7A depicts a decision method of the logical region according to a first modification of the present embodiment. The device driver 20 according to the present modification is configured to decide the logical region based on the window region including the cursor C of the notebook computer 1. In the example of FIG. 7A, two window regions W1 and W2 are displayed on the display surface H, and the cursor C is included in the window region W1 on the back side with respect to the window region W2. Therefore, the device driver 20 decides the logical region R based on the window region W1 at S4 of FIG. 4. As a result, the logical region R can also be decided based on the window region on the back side (window region not having input focus).

Although part of the logical region R overlaps the window region W2 in the example of FIG. 7A, the device driver 20 can output the absolute coordinates indicating the pen position in the region as usual. The operating system or the application receiving the absolute coordinates from the device driver 20 can appropriately decide whether or not to allow displaying the line drawing in the window region W2.

Figure 7B:
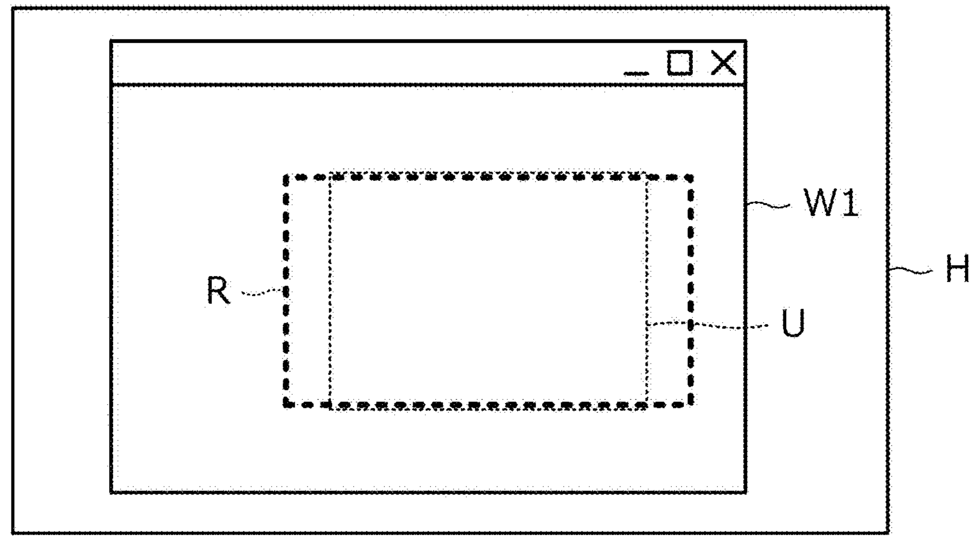
FIG. 7B depicts a decision method of the logical region according to a second modification of the first embodiment of the present disclosure.

FIG. 7B depicts a decision method of the logical region according to a second modification of the present embodiment. The device driver 20 according to the present modification is configured to decide the logical region based on the region set on the display surface H through a user operation or an application. In the example of FIG. 7B, a region U (region surrounded by a dashed line) is set through a user operation or an application in the window region W1 displayed by one of the applications, and the device driver 20 according to the present modification is configured to decide the logical region R based on the region U at S4 of FIG. 4. As a result, the logical region R can also be decided based on any region that is not a window region.

Note that the specific method of setting the region U is not particularly limited. For example, the user may set the application to a logical region setting mode and move the cursor in a diagonal direction to set the region U. The user may designate numerical values of the vertical length, the horizontal length, and the position in a menu screen of the application to set the region U.

Next, the system for touch pad according to a second embodiment of the present disclosure will be described. The system for touch pad according to the present embodiment is different from the system for touch pad according to the first embodiment in that the touch surface T includes a structure that visualizes the trajectory of the pen P on the touch surface T. The system for touch pad according to the second embodiment is similar to the system for touch pad according to the first embodiment in other respects. Therefore, the same reference signs are provided to the same components, and the difference from the system for touch pad according to the first embodiment will be mainly described.

Figure 8:
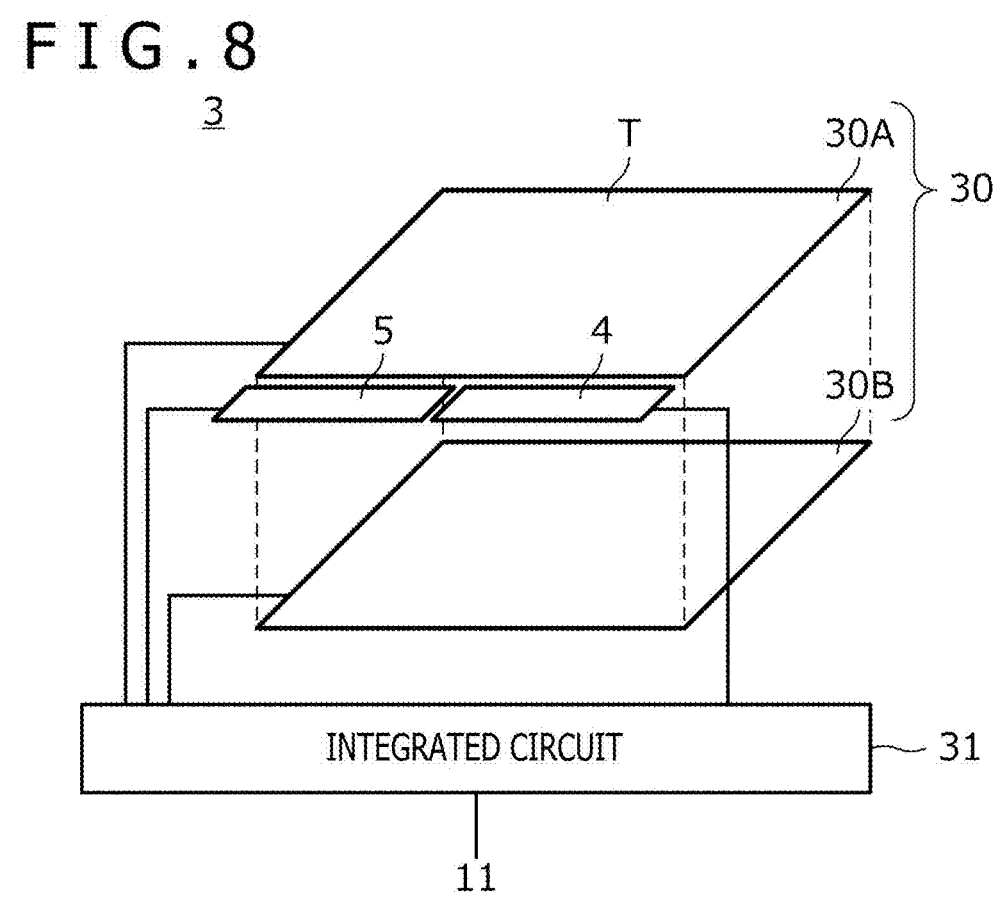

FIG. 8 depicts the touch pad 3 according to the present embodiment. As illustrated in FIG. 8, the touch pad 3 according to the present embodiment is different from the touch pad 3 according to the first embodiment in that, in the touch pad 3 according to the present embodiment, the touch panel 30 includes a pressure-sensitive display 30A and a sensor electrode group 30B, and the right click button 4 and the left click button 5 also described in the first embodiment are included as components of the touch pad 3.

The touch surface T according to the present embodiment is provided by a display surface of the pressure-sensitive display 30A. The pressure-sensitive display 30A is a display in which, when pressure equal to or greater than a predetermined threshold is applied to press the display surface, the color of the part changes. The threshold of the pressure that changes the color is set to a value smaller than the pressure applied to the touch surface T by the pen P and greater than the pressure applied to the touch surface T by the finger F. Therefore, the pressure-sensitive display 30A can selectively display the trajectory of the pen P on the touch surface T.

Further, the pressure-sensitive display 30A can also apply a current of a predetermined value to a predetermined terminal to reset the display. The color of the reset display surface of the pressure-sensitive display 30A as a whole returns to the color before the press of the display surface with use of the pressure equal to or greater than the predetermined threshold. Therefore, the user can use the pen P to write a new entry on the touch surface T not displaying anything.

The configuration of the sensor electrode group 30B is the same as the configuration of the sensor electrode group described in the first embodiment. The right click button 4 and the left click button 5 have the configurations and roles described in the first embodiment. However, the right click button 4 and the left click button 5 according to the present embodiment are connected to the input-output circuit 11 through the integrated circuit 31.

The integrated circuit 31 has the function described in the first embodiment. In addition, the integrated circuit 31 is configured to supply information indicating the press of the right click button 4 or the left click button 5 to the input-output circuit 11 and apply the predetermined current to the predetermined terminal of the pressure-sensitive display 30A when the button is pressed. Therefore, the right click button 4 and the left click button 5 according to the present embodiment also serve as bulk delete buttons for deleting the display of the pressure-sensitive display 30A at once.

As described above, according to the present embodiment, the trajectory of the pen P is displayed on the touch surface T. Therefore, the user can use the pen P to input an entry while visually checking the written content on the touch surface T, and the user can more comfortably perform the pen input on the touch surface T.

The pressure-sensitive display 30A is used, and therefore, the trajectory of the pen P can be displayed on the touch surface T with a simpler configuration than in a case of using a liquid crystal display or the like.

Although the right click button 4 and the left click button 5 also serve as bulk delete buttons in the example described in the present embodiment, only one of the right click button 4 and the left click button 5 may serve as a bulk delete button, or a bulk delete button may be provided separately from the right click button 4 and the left click button 5.

Although the preferred embodiments of the present disclosure have been described, the present disclosure is not limited to the embodiments in any way, and it is obvious that the present disclosure can be carried out in various modes without departing from the scope of the present disclosure.

For example, although the present disclosure is applied to the touch pad of the notebook computer in the examples described in the embodiments, the present disclosure can also be widely applied to touch pads provided on apparatuses other than the notebook computer.

Although the method of coordinate conversion performed by the device driver 20 is changed according to the type of contact position in the embodiments, the method of coordinate conversion performed by the device driver 20 may be changed based on the user setting on a freely-selected application or operating system. In this way, the user can use the finger F to input a line drawing or use the pen P to control the cursor as the user wishes.

Although the device driver 20 executed by the CPU 12 converts the coordinates in the embodiments, the coordinates may be converted in the integrated circuit 31. In this case, it is preferable to supply information regarding the logical region from the device driver 20 to the integrated circuit 31.

It is to be noted that the embodiment of the present disclosure is not limited to the foregoing embodiment, and that various changes can be made without departing from the spirit of the present disclosure.

What is claimed is:

1. A method for a touch pad used by a pen to input operations to a computer, the method comprising:
- detecting, by an integrated circuit, a pen position on a touch surface;
- outputting, by the integrated circuit, the pen position to the computer;
- converting, by the computer, the pen position into absolute coordinates in a coordinate system of a logical region held by the computer;
- determining, by the computer, the logical region based on a window region including a cursor of the computer; and
- outputting, by the computer, the absolute coordinates.

2. The method according to claim 1, further comprising:
- releasing, by the computer, the logical region when the integrated circuit stops the outputting of the pen position for a predetermined period.

3. The method according to claim 1, further comprising:
- releasing, by the computer, the logical region when a touch position is received from the integrated circuit.

4. The method according to claim 1, further comprising:
- determining, by the computer, the logical region based on a region set on a display surface through a user operation or an application.

5. The method according to claim 1, further comprising:
- determining, by the computer, the logical region based on a window region having input focus by an operating system of the computer.

6. The method according to claim 5, wherein the logical region includes all of the window region.

7. The method according to claim 1, further comprising:
- regarding, by the computer, the pen position as a start point in detecting relative coordinates when a touch position is received after the pen position.

8. The method according to claim 1, further comprising:
- causing, by the computer, a trajectory of the pen to be displayed on a display surface of a pressure-sensitive display of the touch surface.

9. The method according to claim 8, further comprising:
- causing, by the computer, the trajectory displayed on the display surface of the pressure-sensitive display to be deleted in response to an operation of a button of the touch pad.

10. A method executed by a computer, the method comprising:
- determining whether a pen position is detected within a touch surface; and
- in response to determining that the pen position is detected within the touch surface, determining whether a logical region has been determined;
- (i) in response to determining that the logical region has already been determined, converting an absolute coordinate indicating the pen position expressed by a coordinate system of the touch surface to an absolute coordinate expressed by a coordinate system of the logical region that has already been determined; and
- (ii) in response to determining that the logical region has not yet been determined, determining the logical region based on a window region focused by an operating system, a window region that contains a cursor, or a region set by user operation or application; and
- storing the logical region in a memory.

11. The method according to claim 10, further comprising:
- determining whether a touch position or the pen position is detected within the touch surface, and
- in response to determining that the touch position is detected within the touch surface, converting an absolute coordinate indicating the touch position expressed by the coordinate system of the touch surface into a relative coordinate indicating a distance and a direction of movement of the touch position.

12. The method according to claim 11, further comprising:
- in response to determining that the touch position is detected, deleting the logical region from the memory.

13. The method according to claim 11, further comprising:
- in response to the touch position being detected after the pen position, detecting the relative coordinate starting from the pen position.

14. The method according to claim 10, further comprising:
- in response to determining that detection of the pen position stops for a threshold period, deleting the logical region from the memory.

* * * * *